United States Patent
Frolund et al.

(10) Patent No.: US 7,725,655 B2
(45) Date of Patent: May 25, 2010

(54) METHOD OF OPERATING DISTRIBUTED STORAGE SYSTEM IN WHICH DATA IS READ FROM REPLICATED CACHES AND STORED AS ERASURE-CODED DATA

(75) Inventors: Svend Frolund, Aalborg (DK); Arif Merchant, Palo Alto, CA (US); Alistair Veitch, Palo Alto, CA (US); James M. Reuter, Colorado Springs, CO (US); James Perry Jackson, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 444 days.

(21) Appl. No.: 11/357,815

(22) Filed: Feb. 16, 2006

(65) Prior Publication Data

US 2007/0192542 A1 Aug. 16, 2007

(51) Int. Cl.
*G06F 12/00* (2006.01)
(52) U.S. Cl. .................. 711/119; 711/114; 711/162; 714/6; 707/674; 709/201
(58) Field of Classification Search .................. 711/119
See application file for complete search history.

(56) References Cited

U.S. PATENT DOCUMENTS

| | | | | |
|---|---|---|---|---|
| 5,787,459 A | * | 7/1998 | Stallmo et al. | 711/112 |
| 5,913,215 A | * | 6/1999 | Rubinstein et al. | 707/10 |
| 2004/0230596 A1 | | 11/2004 | Veitch et al. | |
| 2004/0230624 A1 | | 11/2004 | Frolund et al. | |
| 2004/0230862 A1 | | 11/2004 | Merchant et al. | |
| 2005/0091450 A1 | | 4/2005 | Frolund et al. | |
| 2005/0091451 A1 | | 4/2005 | Frolund et al. | |
| 2005/0091556 A1 | | 4/2005 | Frolund et al. | |

OTHER PUBLICATIONS

Aguilera, M.K. et al., Strict linearizability and the power of aborting, HP Labs Tech. Report HPL-2003-241, Dec. 8, 2003, Palo Alto, CA.
Attiya, H. et al., Sharing memory robustly in message-passing systems, ACM Jour., vol. 42, No. 1, Jan. 1995, pp. 124-142.
Frolund, S. et al., A decentralized algorithm for erasure-coded virtual disks, HP Labs Tech. Report HPL-2004-46, Apr. 2, 2004, Palo Alto, CA.
Frolund, S. et al., Building storage registers from crash-recovery processes, HP Labs Tech. Report HPL-SSP-2003-14, 2003, Palo Alto, CA.
Frolund, S. et al., FAB: Enterprise storage systems on a shoestring, Proc. 9th Workshop on HOTOS, May 2003, pp. 169-174, USENIX Assoc., Berkeley, CA.

(Continued)

*Primary Examiner*—Christian P Chace
*Assistant Examiner*—Matthew Bradley

(57) ABSTRACT

Data blocks are read from a distributed cache. The distributed cache comprises m replicated caches, each replicated cache including a plurality of independent computing devices. Each independent computing device of the replicated caches holds a replica of a particular one of the m data blocks in memory. The m data blocks and p parity blocks are stored across m plus p independent computing devices. Each of the m plus p independent computing devices stores a single block selected from the m data blocks and the p parity blocks.

19 Claims, 13 Drawing Sheets

OTHER PUBLICATIONS

Goodson, G.R. et al., Decentralized storage consistency via versioning servers, CMU Tech. Report CMU-CS-O2-180, Sep. 2002, Pittsburgh, PA.

Kubiatowicz, J. et al., OceanStore: An architecture for global-scale persistent storage, Proc. 9th Int. Conf. on ASPLOS Nov. 2000, ACM.

Lynch, N. et al., Robust emulation of shared memory using dynamic quorum-acknowledged broadcasts, Dec. 1996, MIT, Cambrigde, MA.

Plank, J.S. et al., A tutorial on Reed-Solomon coding for fault-tolerance in RAID-like systems, Software Practice and Experience, vol. 27(9), Sep. 1997, pp. 995-1012.

Weatherspoon, H. et al., Erasure coding vs. replication: A quantitative comparison, 2002, Computer Sci. Div., Univ. of Cal., Berkeley, CA.

U.S. Appl. No. 11/357,776, filed Feb. 16, 2006, by Frolund et al.

U.S. Appl. No. 11/357,776, Office Action dated Apr. 6, 2009, pp. 1-7 and attachment.

\* cited by examiner

1200

1202:
1: procedure get-state(*ts*)
2:   *replies* ← Q-form([Read, $D_i$])
3:   *max-ts* ← the highest timestamp returned
4:   *max-val* ← the value with timestamp *max-ts*
5:   *replies* ← Q-form([ExtUpdate, *ts*, *max-ts*])
6:   if all *replies* are true then return *max-val*
7:   else *val* ← recover(*ts*)
8:     if *val* = ABORT then return ABORT
9:     else *replies* ← Q-form([ExtUpdate, *ts*, *ts*])
10:      if all *replies* are true then return *val*
11:      else return ABORT 1204:
12: procedure compress(*ts*)
13:   *replies* ← Q-form([Compress, *ts*])
14:   if a reply is false then return ABORT
15:   else return OK 1206:
16: procedure advance(*ts*)
17:   *replies* ← Q-form([Order, *ts*])
18:   if a reply is false then return ABORT
19:   else *replies* ← Q-form([ExtUpdate, *ts*, *ts*])
20:     if a reply is false then return ABORT
21:     else return OK 1208:
22: procedure invalidate(*ts*)
23:   *replies* ← Q-form([Write, EMPTY, *ts*])
24:   if a reply is false then return ABORT
25:   else return OK 1210:
26: procedure write(*val*)
27:   *ts* ← newTS()
28:   *replies* ← Q-form([Order, *ts*])
29:   if a reply is false then return ABORT
30:   else *replies* ← Q-form([Write, *val*, *ts*])
31:     if all *replies* are true then return OK
32:     else return ABORT 1212:
33: procedure read()
34:   $p_j$ ← a randomly chosen element of $D_i$
35:   *replies* ← Q-form([Read, {*j*}])
36:   if all replies are true and $p_j$ responded and all timestamps are equal then return $p_j$'s value
37:   else return recover(newTS())

1214:
38: procedure recover(*ts*)
39:   *replies* ← Q-form([Order&Read, *ts*])
40:   if a reply is false then return ABORT
41:   *val* ← the value with highest *val-ts* from replies
42:   *replies* ← Q-form([Write, *val*, *ts*])
43:   if all *replies* are true then return *val*
44:   else return ABORT

FIG. 12A

51: *val-ts* ← *ord-ts* ← *flush-ts* ← *export-ts* ← lowTS
52: *val* ← EMPTY

1252:
53: when Q-receive([Read, *r-set*])
54:    *status* ← *val-ts* ≥ *ord-ts*
55:    if *k* ∈ *r-set* then Q-reply([*status*, val-ts, val])
56:    else Q-reply([*status*, val-*ts*])

1254:
57: when Q-receive([ExtUpdate, *ts*, *cur-ts*])
58:    *status* ← (*ts* ≥ *flush-ts* and *cur-ts* ≥ *export-ts*)
59:    if *status* then
60:      *export-ts* ← *cur-ts*; store(*export-ts*)
61:      *flush-ts* ← *ts*; store(*flush-ts*)
62:    Q-reply([*status*])

1256:
63: when Q-receive([Compress, *ts*])
64:    *status* ← (*ts* ≥ *flush-ts* and *export-ts* ≥ *val-ts*)
65:    if *status* then
66:      *val* ← EMPTY; store(*val*)
67:      *val-ts* ← *export-ts*; store(*val-ts*)
68:    Q-reply([*status*])

1258:
69: when Q-receive([Order, *ts*])
70:    *status* ← (*ts* > max(*val-ts*, *ord-ts*))
71:    if *status* then *ord-ts* ← *ts*; store(*ord-ts*)
72:    Q-reply([*status*])

1260:
73: when Q-receive([Write, *new-val*, *ts*])
74:    *status* ← (*ts* > *val-ts* and *ts* ≥ *ord-ts*))
75:    if *status* then
76:      *val* ← *new-val*; store(*val*)
77:      *val-ts* ← *ts*; store(*val-ts*)
78:    Q-reply([*status*])

1262:
79: when Q-receive([Order&Read, *ts*])
80:    *status* ← (*ts* > max(*val-ts*, *ord-ts*))
81:    if *status* then *ord-ts* ← *ts*; store(*ord-ts*)
82:    Q-reply([*val-ts*, *val*, *status*])

FIG. 12B

101: cache ← [cache-register($D_1$),..., cache-register($D_m$)]  ⟋1300
102: strip ← ec-register 1302:
103: procedure synthesize-stripe()
104:    for i in 1...m do
105:       times[i] ← newTS()
106:       stripe[i] ← cache[i].get-state(times[i])
107:    if stripe has fewer than [m/2] EMPTY values then
108:       for i in 1...m do
109:          if stripe[i] = EMPTY then
110:             stripe[i] ← strip.read-block(i)
111:       max-ts ← the highest timestamp in times
112:       strip.write-stripe(max-ts, stripe)
113:    else
114:       for i in 1...m do
115:          if stripe[i] ≠ EMPTY then
116:             strip.write-block(times[i], i, stripe[i])
117:    for i in 1...m do cache[i].compress(times[i])
118:    return OK 1304:
119: procedure write-stripe(stripe)
120:    ts ← newTS()
121:    for i in 1...m do cache[i].advance(ts)
122:    strip.write-stripe(ts, stripe)
123:    for i in 1...m do cache[i].invalidate(ts)
124:    return OK 1306:
125: procedure write-block(val, index)
126:    return cache[index].write(val)

1308:
127: procedure read-stripe()
128:    for i in 1...m do stripe[i] ← read-block(i)
129:    return stripe 1310:
130: procedure read-block(index)
131:    val ← cache[index].read()
132:    if val = EMPTY then val ← strip.read-block(index)
133:    return val

FIG. 13

METHOD OF OPERATING DISTRIBUTED STORAGE SYSTEM IN WHICH DATA IS READ FROM REPLICATED CACHES AND STORED AS ERASURE-CODED DATA

RELATED APPLICATIONS

This application is related to U.S. application Ser. No. 11/357,776, filed on Feb. 16, 2006, the contents of which are hereby incorporated by reference.

FIELD OF THE INVENTION

The present invention relates to the field of distributed computing. More particularly, the present invention relates to the field of distributed computing where a distributed storage system employs erasure coding for data storage.

BACKGROUND OF THE INVENTION

A critical component of computer systems is data storage. Data storage can be divided conceptually into an individual user's data storage, which is attached directly to the individual's computer, and network based data storage typically intended for multiple users.

One type of network based storage device is a disk array. Typically, the disk array includes at least one controller, memory (e.g., non-volatile memory), and an array of disks. The memory acts a cache for data that is to be written to the array of disks. The data is held in the memory until the controller has an opportunity to write the data to disk. Typically, components (e.g., the controller and the disks) of the disk array are hot swappable, which allows components to be replaced without turning off the disk array.

As an alternative to the disk array, researchers have been exploring data storage within a distributed storage system that includes an array of independent computing devices coupled together by a network. Each of the independent computing devices includes a processor, memory (e.g., non-volatile memory), and one or more disks. An advantage of the array of independent computing devices is lower cost. The lower cost can result from mass production of the independent computing devices as commodity items and from elimination of hot swappable features of the disk array. Another advantage is better scalability. The user can buy a few devices initially and add more devices as demand grows.

Replication and erasure coding have been explored as techniques for enhancing reliability for an array of independent computing devices. A replication technique employed by the array of independent computing devices replicates data blocks across a set of storage devices (e.g., three storage devices). This set is called the replica set for the data blocks. Erasure coding stores m data blocks and p parity blocks across a set of n storage devices, where n=m+p. For each set of m data blocks that is striped across a set of m storage devices, a set of p parity blocks is stored on a set of p storage devices.

The memory of each independent computing device may be employed to cache write data that is to be written to the disks of the independent computing device. For both replication and erasure coding this means that the memory of the independent storage devices that will store the data must be used for the write caching. It would be desirable to also be able to reliably use memory of other independent computing devices to cache the write data for replication and erasure coding.

For erasure coded data, there are additional problems. A full stripe of data must be received to efficiently make use of the memory since, if less than the full stripe of data is received, one or more missing data blocks must be read from disk in order to determine the new parity blocks and reading the missing data blocks takes significantly more time than placing data in the memory. Moreover, for erasure coded data, sometimes data blocks of a stripe may not be received together but will arrive over a relatively short period of time. It would be desirable to be able to efficiently cache such write data without having to read missing data blocks from disk.

SUMMARY OF THE INVENTION

The present invention comprises a method of operating a distributed storage system. According to an embodiment, the method includes reading m data blocks from a distributed cache. The distributed cache comprises memory of a plurality of independent computing devices that include redundancy for the m data blocks. The m data blocks and p parity blocks are stored across m plus p independent computing devices. Each of the m plus p independent computing devices stores a single block selected from the m data blocks and the p parity blocks.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIGS. 12A and 12B provide embodiments of a method of operating a replicated cache of the present invention as pseudo code; and FIG. 13 provides embodiments of a method of operating a distributed storage system of the present invention as pseudo code.

DETAILED DESCRIPTION OF A PREFERRED EMBODIMENT

This detailed description describes embodiments of two inventions, which are a method of operating a replicated cache and a method of operating a distributed storage system. A first section of this detailed description discusses embodiments of the method of operating the replicated cache. A second section discusses embodiments of the method of operating the distributed storage system. A third section discusses pseudo code embodiments of both methods.

1. Method of Operating Replicated Cache

Figure 1:
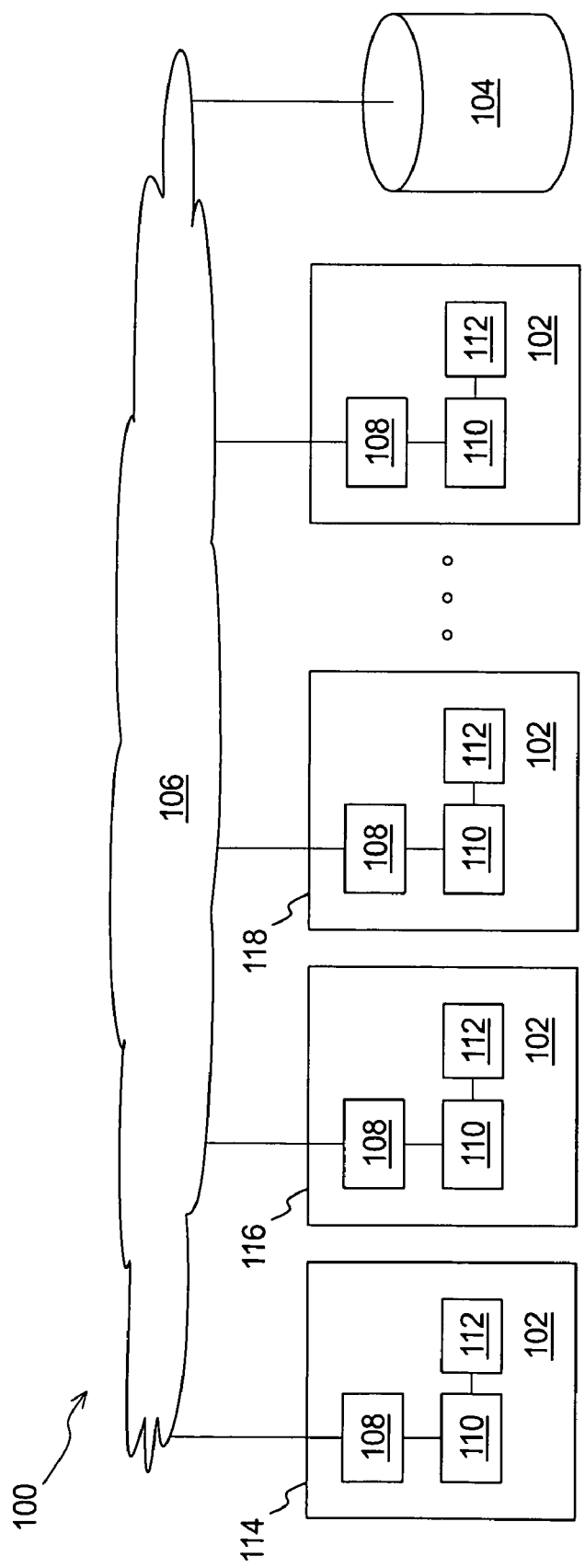
FIG. 1 schematically illustrates a replicated cache that employs a method of operation in accordance with embodiments of the present invention.

A computing system that employs a method of operating a replicated cache in accordance with embodiments of the present invention is illustrated schematically in FIG. 1. The computing system 100 comprises independent computing devices 102 and storage 104, which are coupled together by a network 106. Each of the independent computing devices 102 comprises a network interface 108, a processor 110, and memory 112 (e.g., non-volatile RAM), which are coupled together. Any set of at least three of the independent computing devices may form a replicated cache for one or more units of data (e.g., data blocks). For example, first through third independent computing devices, 114 . . . 118, may form a replicated cache for the one or more units of data. The independent computing devices 102 of a replicated cache communicate by message passing. The replicated cache is asynchronous; there is no bound on message transmission times and there is no bound on the time it takes a process to execute a task.

Figure 2:
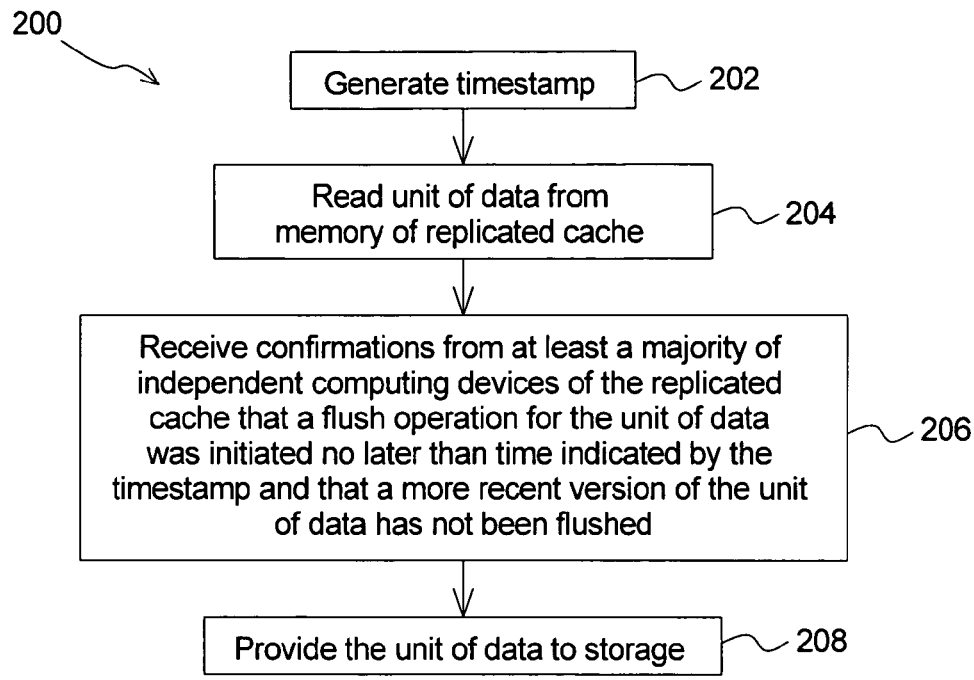
FIG. 2 illustrates an embodiment of a method of operating a replicated cache of the present invention as a flow chart.

An embodiment of a method of operating a replicated cache of the present invention is illustrated as a flow chart in FIG. 2. The method 200 copies data from a replicated cache to storage. The method 200 begins with a first step 202 of generating a timestamp. Preferably, the timestamp is a unique timestamp so that other timestamps that may be issued will either precede or follow the timestamp. One technique for ensuring unique timestamps is to include a time indicator and an identifier for a computing entity that issued the timestamp. For example, the timestamp may be generated by the first independent computing device 114 of FIG. 1 and such a timestamp may include the time indicator and an identifier (e.g., a unique network address) for the first independent computing device. In the example, if two computing entities each generate a timestamp having the same time indicator, the identifier may be used to break the tie (e.g., the lower network address may signify an earlier timestamp).

In a second step 204, a unit of data is read from memory of the replicated cache. The replicated cache comprises a plurality of independent computing devices (e.g., the first through third independent computing devices, 114 . . . 118, of FIG. 1). Each independent computing device comprises a processor and the memory. The independent computing devices may form at least a portion of a distributed storage system. Such a distributed storage system may further include other independent computing devices. Some or all of the independent computing devices may include storage (e.g., refer to FIG. 6 discussed below).

The method 200 continues with a third step 206 of receiving confirmations from at least a majority of the independent computing devices that a flush operation for the unit of data was initiated no later than a time indicated by the timestamp and that a more recent version of the unit of data has not been flushed. The condition that a flush operation was initiated no later than a time indicated by the timestamp ensures consistency of flush operations. The condition that a more recent version of the unit of data has not been flushed ensures that newer data is not overwritten by older data in storage.

In a fourth step 208, the unit of data is provided to storage. The storage may be storage within a distributed storage system or some other storage such as a disk array. Preferably, the storage employs a data protection technique such as replication or erasure coding. For example, the storage may be a distributed storage system of independent computing devices, each of which includes storage. Collectively, the independent computing devices employ replication or erasure coding. Or, for example, the storage may be a disk array that employs a RAID (redundant array of independent disks) technique (e.g., RAID 1 or 5).

The first through fourth steps, 202 . . . 208, of generating the timestamp, reading the unit of data, receiving the confirmations, and providing the unit of data to the storage may be performed by a flush coordinator. The flush coordinator may be one of the independent computing devices of the replicated cache (e.g., the first independent computing device 114). Alternatively, the flush coordinator may be an independent computing device that includes at least a portion of the storage or it may be some other computing entity.

Normally, if an independent computing device of the replicated cache holds a copy of the unit of data in its memory, each of the other independent computing devices of the replicated cache holds a copy of the unit of data in its memory. However, at times, only a portion of the independent computing devices of the replicated cache may hold the unit of data. Provided that at least a majority of the independent computing devices of the replicated cache hold the unit of data in memory, the unit of data may be successfully read from the replicated cache. For example, prior to instantiating the method 200, somewhere between a majority and all of the independent computing devices of the replicated cache may hold a copy of the unit of data in memory. If a client issues a read request for the unit of data, a read coordinator ensures that at least a majority of the independent computing devices of the replicated cache participate in the response, which confirms that data provided to the client is the correct version of the data.

Figure 3:
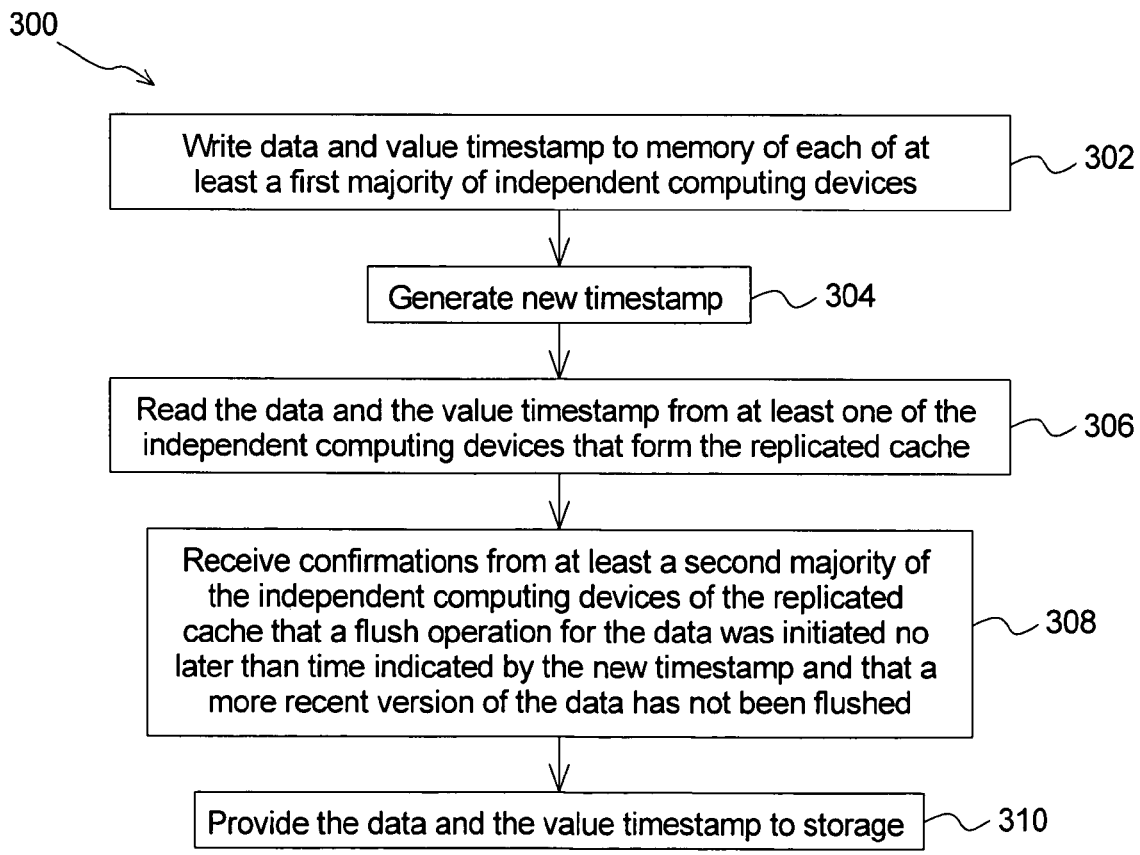
FIG. 3 illustrates another embodiment of a method of operating a replicated cache of the present invention as a flow chart.

Another embodiment of a method of operating a replicated cache is illustrated as a flow chart in FIG. 3. The method 300 adds an additional step to the method 200. The additional step writes data and a value timestamp to the replicated cache. In an embodiment, the value timestamp is issued by a write coordinator that writes the data and the value timestamp to the replicated cache. The value timestamp may be used to ensure data consistency. For example, the value timestamp may be used to ensure that a version of the data is not overwritten by an earlier version of the data.

The method 300 begins with a first step 302 of writing data and a value timestamp to memory of each of at least a first majority of independent computing devices of the replicated cache. The independent computing devices form the replicated cache. For example, the replicated cache may be the first through third independent computing devices, 114 . . . 118, of FIG. 1. Each independent computing device comprises a processor and the memory. The independent computing devices may form at least a portion of a distributed storage system. Such a distributed storage system may further include other independent computing devices. Some or all of the independent computing devices may include storage (e.g., disk storage). The first step 302 may be performed by a write coordinator. The write coordinator may be one of the independent computing devices that form the replicated cache or it may be another computing entity such as a client that provides the data.

The method 300 continues with a second step 304 of generating a new timestamp. Preferably, the new timestamp is a unique timestamp so that other timestamps that may be issued will either precede or follow the new timestamp. One technique for ensuring unique timestamps is to include a time indicator and an identifier for a computing entity that issued the timestamp.

In a third step 306, the data and the value timestamp is read from at least one of the independent computing devices that form the replicated cache.

The method continues with a fourth step 308 of receiving confirmations from at least a second majority of the independent computing devices that a flush operation for the data was initiated no later than a time indicated by the new timestamp and that a more recent version of the data has not been flushed. The condition that a flush operation was initiated no later than a time indicated by the timestamp ensures consistency of flush operations. The condition that a more recent version of the unit of data has not been flushed ensures that newer data is not overwritten by older data in storage. Each confirmation may indicate that a replying independent computing device determined that a flush timestamp was no later than the new timestamp and that an export timestamp was no later than the value timestamp. The flush timestamp ensures consistency of flush operations. The export timestamp ensures that newer data is not overwritten by older data in the storage.

In a fifth step 310, the data and the value timestamp is provided to the storage. The storage may be storage within a distributed storage system or some other storage such as a disk array. Preferably, the storage employs a data protection technique such as replication or erasure coding.

The second through fifth steps, 304 . . . 310, of generating the new timestamp, reading the data and the value timestamp, receiving the confirmations, and providing the data and the value timestamp to the storage may be performed by a flush coordinator. The flush coordinator may be one of the independent computing devices that holds the data (e.g., the first independent computing device 114). Alternatively, the flush coordinator may be an independent computing device that includes at least a portion of the storage or it may be some other computing entity. The flush coordinator and the write coordinator may be a single computing entity.

Figure 4:
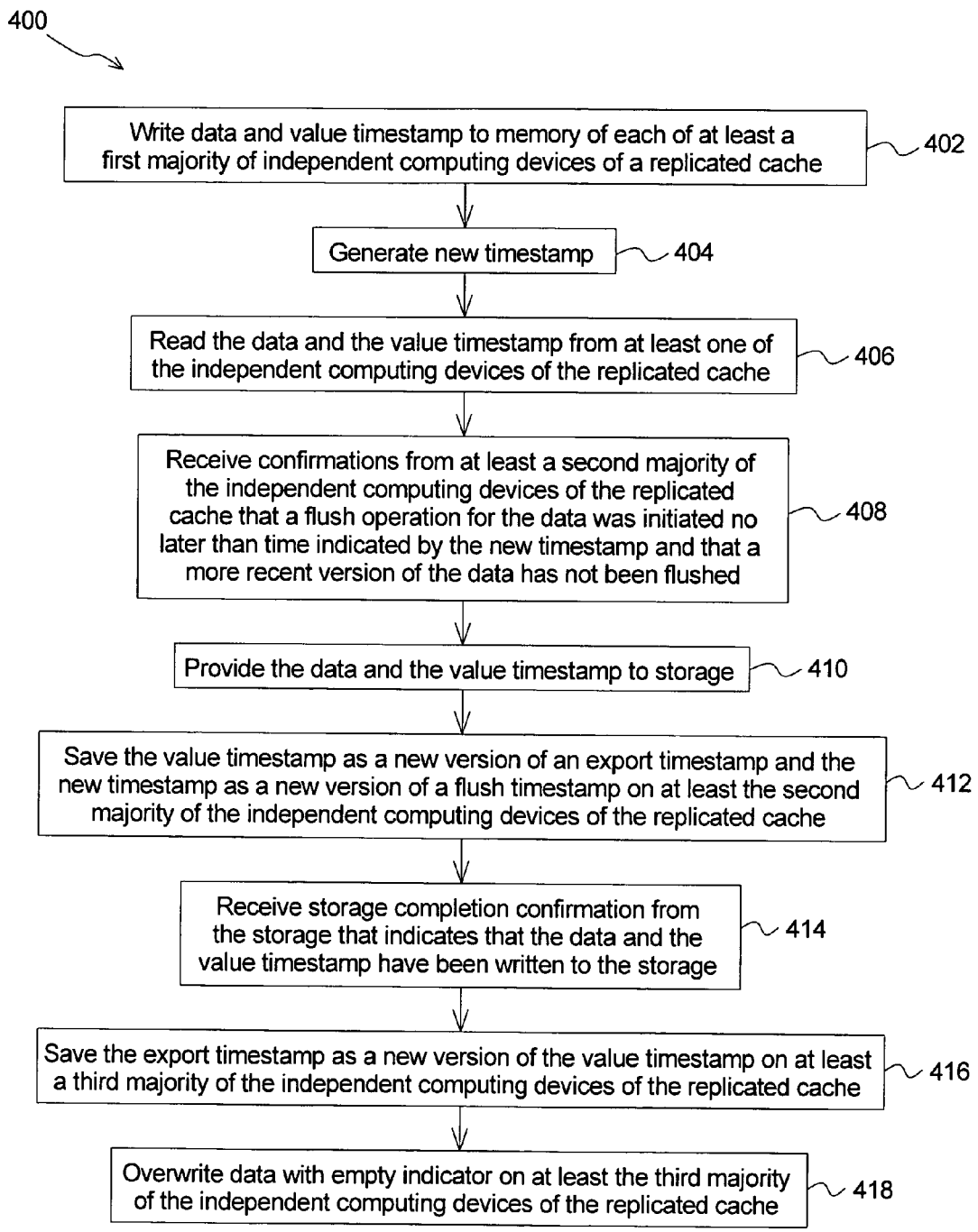
FIG. 4 illustrates yet another embodiment of a method of operating a replicated cache of the present invention as a flow chart.

An embodiment of a method of operating a replicated cache of the present invention is illustrated as a flow chart in FIG. 4. The method 400 adds additional steps to the method 300. The additional steps update the flush and export timestamps and write an empty indicator to at least a majority of independent computing devices of the replicated cache.

The method 400 begins with a first step 402 of writing data and a value timestamp to memory of each of at least a first majority of independent computing devices of the replicated cache. In a second step 404, a new timestamp is generated. In a third step 406, the data and the value timestamp is read from at least one of the independent computing devices that form the replicated cache. In a fourth step 408, confirmations are received from at least a second majority of the independent computing devices that a flush operation for the data was initiated no later than a time indicated by the new timestamp and that a more recent version of the data has not been flushed. Each confirmation indicates that a replying independent computing device determined that a flush timestamp was no later than the new timestamp and that an export timestamp was no later than the value timestamp. In a fifth step 410, the data and the value timestamp are provided to the storage.

In a sixth step 412, the value timestamp is saved as a new version of the export timestamp and the new timestamp is saved as a new version of the flush timestamp on at least the second majority of the independent computing devices of the replicated cache. In a seventh step 414, a storage-completion confirmation is received from the storage that indicates that the data and the value timestamp have been written to the storage. In an eighth step 416, the export timestamp is saved as a new version of the value timestamp on at least a third majority of the independent computing devices. In a ninth step 418, the data is overwritten with an empty indicator on at least the third majority of the independent computing devices. The eighth and ninth steps, 416 and 418, may be delayed for a period of time so that the data may be read from the replicated cache rather than having to read it from the storage.

If a read coordinator attempts to access the replicated cache following the ninth step 418, it may read the empty indicator and the new version of the value timestamp from at least one of the independent computing devices and confirm that at least a fourth majority of the independent computing devices hold the new version of the value timestamp. In such a situation, the read coordinator may access the storage to obtain the data and the value timestamp.

In another situation following the ninth step 418, the read coordinator may read the empty indicator and the new version of the value timestamp from at least one of the independent computing devices but determine that at least one of the independent computing devices holds a more recent version of the value timestamp. In such a situation, the read coordinator may perform a recover operation. The recover operation attempts to determine the most recent version of the value timestamp and the most recent version of the data that resides on at least a majority of the independent computing devices of the replicated cache and writes both to all of the independent computing devices of the replicated cache.

Figure 5:
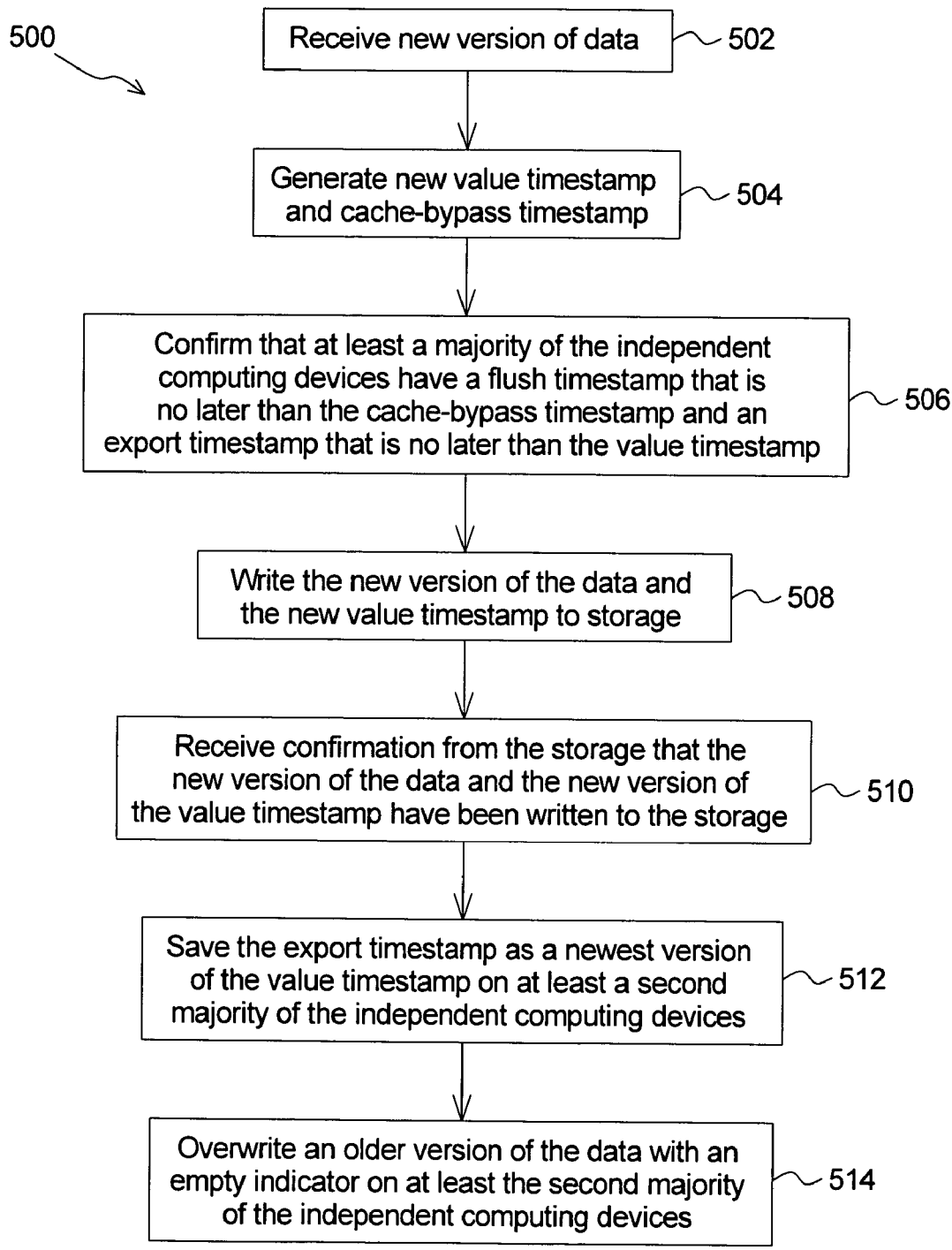
FIG. 5 illustrates an embodiment of a method of bypassing the replicated cache of the present invention as a flow chart.

In some situations, it may be desirable to bypass the replicated cache and directly store a new version of the data in the storage. An embodiment of a method of bypassing the replicated cache is illustrated as a flow chart in FIG. 5. The method 500 begins with a first step 502 of receiving the new version of the data from the client. In a second step 504, a new value timestamp and a cache-bypass timestamp are generated. The method 500 continues with a third step 506 of confirming that at least a majority of the independent computing devices have the flush timestamp that is no later than the cache-bypass timestamp and the export timestamp that is no later than the new value timestamp. In a fourth step 508, the new version of the data and the new value timestamp are written to storage. In a fifth step 510, a confirmation is received from the storage that the new version of the data and the new version of the value timestamp have been written to the storage. The method 500 continues with a sixth step 512 of saving the export timestamp as a newest version of the value timestamp on at least a second majority of the independent computing devices. In a seventh step 514, a version of the data is overwritten with an empty indicator on at least the second majority of the independent computing devices.

2. Method of Operating Distributed Storage System

Figure 6:
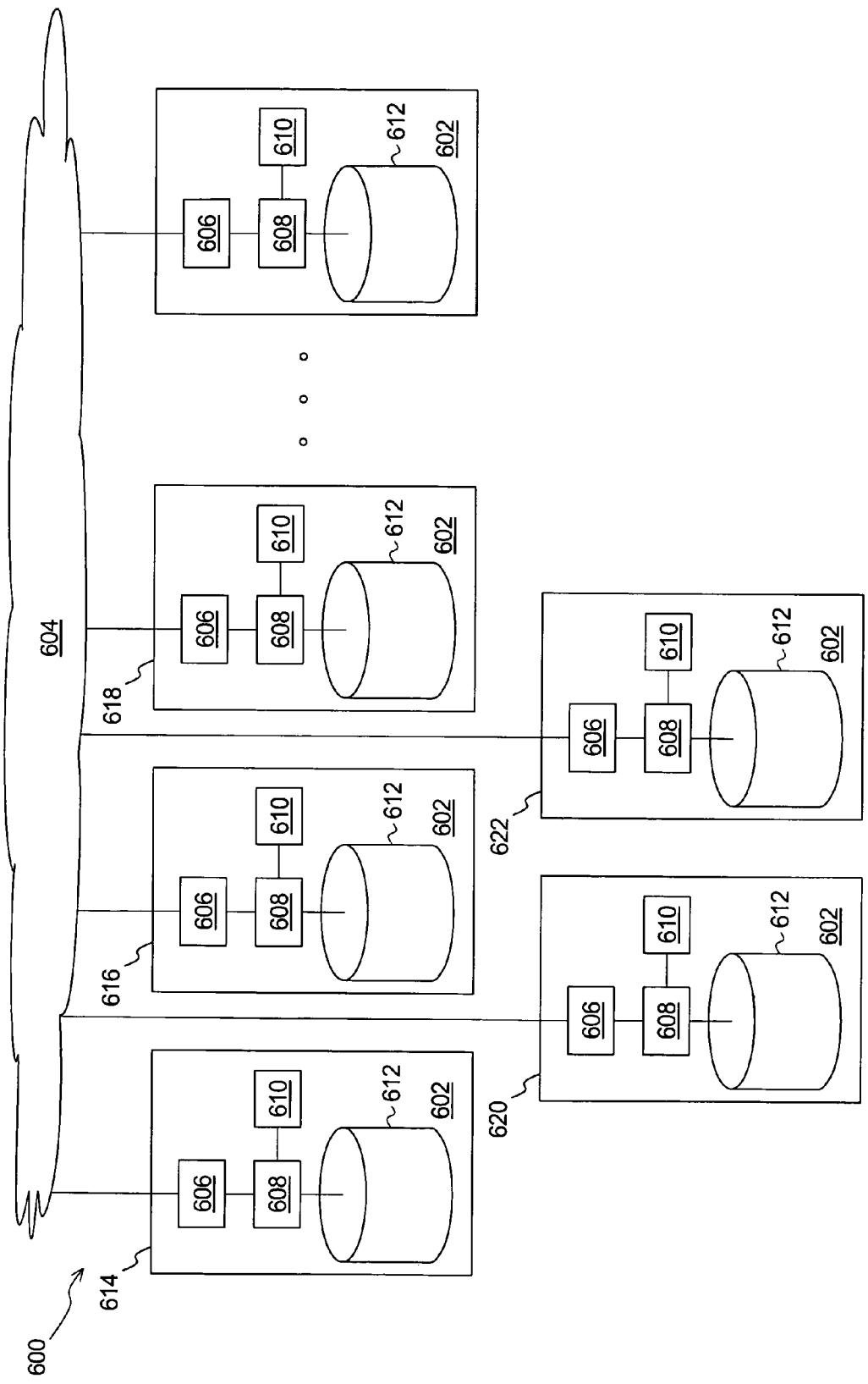
FIG. 6 schematically illustrates a distributed storage system that employs a method of operation in accordance with embodiments of the present invention.

A distributed storage system that employs a method of operation in accordance with embodiments of the present invention is illustrated schematically in FIG. 6. In an embodiment, the distributed storage system 600 comprises independent computing devices 602, which are coupled together by a network 604. Each of the independent computing devices 602 comprises a network interface 606, a processor 608, memory 610, and storage 612, which are coupled together. Preferably, each storage 612 comprises a disk drive. Alternatively, the storage 612 within one or more of the independent computing devices 602 comprise some other storage media such as a tape and a tape drive.

The distributed storage system stores stripes of data using an m out of n erasure coding technique and a replicated cache. Each stripe of data includes m data blocks, which are used to determine p parity blocks. For example, the p parity blocks may be determined from the m data blocks using a Reed-Solomon erasure coding technique. Each stripe of m data blocks and its associated p parity blocks are stored across a set of n independent computing devices, where n=m+p. The m data blocks may be determined using any m blocks selected from the n blocks. In such a situation, value timestamps for a quorum of the n blocks are compared to ensure consistency for returned data. The quorum meets a quorum condition of at least m+p/2 independent computing devices providing the same value timestamp for their respective block of data or parity. The m blocks selected from the n blocks that are used to decode the data have the quorum determined value timestamp.

For example, first through fifth independent computing devices, 614 . . . 622, may store a stripe of erasure coded data, where the first through third independent computing devices, 614 . . . 618, store a stripe of three data blocks and the fourth and fifth independent computing devices, 620 and 622, store two parity blocks. When reading a stripe of the data, any three of five blocks stored across the first through fifth independent computing devices, 614 . . . 622, may provide the stripe of data. For example, the data block stored on the first independent computing device 614 and the first and second parity blocks stored on the fourth and fifth independent computing devices, 620 and 622, may be used to return the stripe of three data blocks. Each of the blocks is stored with a value timestamp. When reading the stripe of data from the first, fourth, and fifth independent computing devices, 614, 620, and 622, the value timestamp provided by these independent computing devices plus one additional independent computing device selected from the second and third independent computing devices, 616 and 618, must return the same value timestamp to ensure consistency of the returned data.

Figure 7:
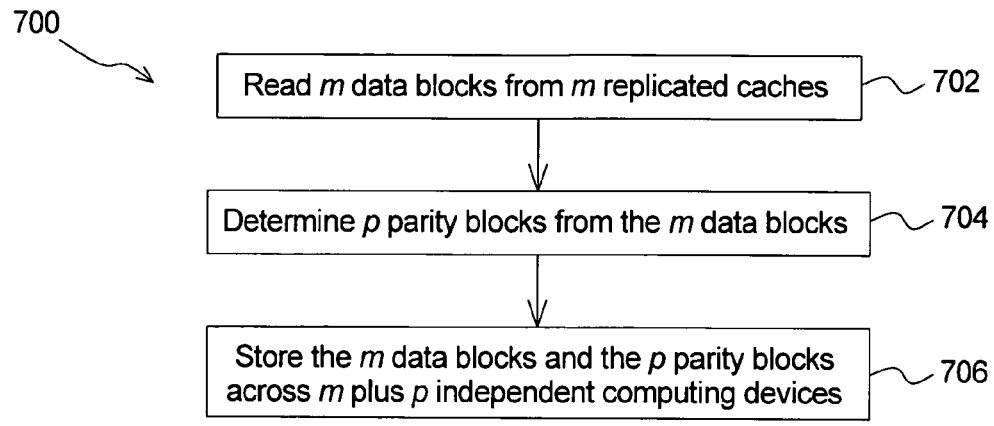
FIG. 7 illustrates an embodiment of a method of operating a distributed storage system of the present invention as a flow chart.

An embodiment of a method of operating a distributed storage system of the present invention is illustrated as a flow chart in FIG. 7, which reads data from replicated caches and stores the data as erasure coded data. The method 700 begins with a first step 702 of reading m data blocks from m replicated caches. Each replicated cache comprises p plus 1 of the independent computing devices. The quantity of p plus 1 independent computing devices ensures that a redundancy provided by each replicated cache at least equals a redundancy provided by an m out of n erasure coded storage. Each independent computing device of a replicated cache holds a particular data block in memory. The independent computing devices may be independent computing devices that include storage.

For example, the first through fifth independent computing devices, 614 . . . 622, may form three replicated caches for a stripe of three data blocks, which is to be stored as five blocks (i.e., the three data blocks and two parity blocks). The first, fourth, and fifth independent computing devices, 614, 620, and 622, may form a replicated cache for the first data block. The second, fourth, and fifth independent computing devices, 616, 620, and 622, may form a replicated cache for the second data block. And, the third through fifth independent computing devices, 618 . . . 622, may form a replicated cache for the third data block. In this example, the three data blocks may be read from the fourth independent computing device 620 or the fifth independent computing device 622. Alternatively, the three data blocks may be read from the first through third independent computing devices, 614 . . . 618, or some other combination that returns the three data blocks.

In an alternative first step, the m data blocks are read from a distributed cache. The distributed cache comprises memory of a plurality of independent computing devices that include redundancy for the m data blocks. The redundancy may be provided by replication or by erasure coding or by some other redundancy technique.

In a second step 704, p parity blocks are determined from the m data blocks. For example, for a three out of five erasure coding technique, the two parity blocks are determined from the three data blocks. If the three replicated caches that hold the three data blocks in memory employ the first through fifth independent computing devices, 614 . . . 622, and the fourth and fifth independent computing devices each hold the three data blocks in memory, each of the fourth and fifth independent computing devices, 620 and 622, may determine its parity block from the three data blocks that each holds in memory.

In an alternative to the second step 704, the alternative first step includes reading the p parity blocks from the distributed cache.

In a third step 706, the m data blocks and the p parity blocks are stored across m plus p independent computing devices. Each of the m plus p independent computing devices stores a single block selected from the m data blocks and the p parity blocks. For example, for a three out of five erasure coding technique, the three data blocks may be stored on the first through third independent computing devices, 614 . . . 618, and the two parity blocks may be stored on the fourth and fifth independent computing devices, 620 and 622.

Figure 8:
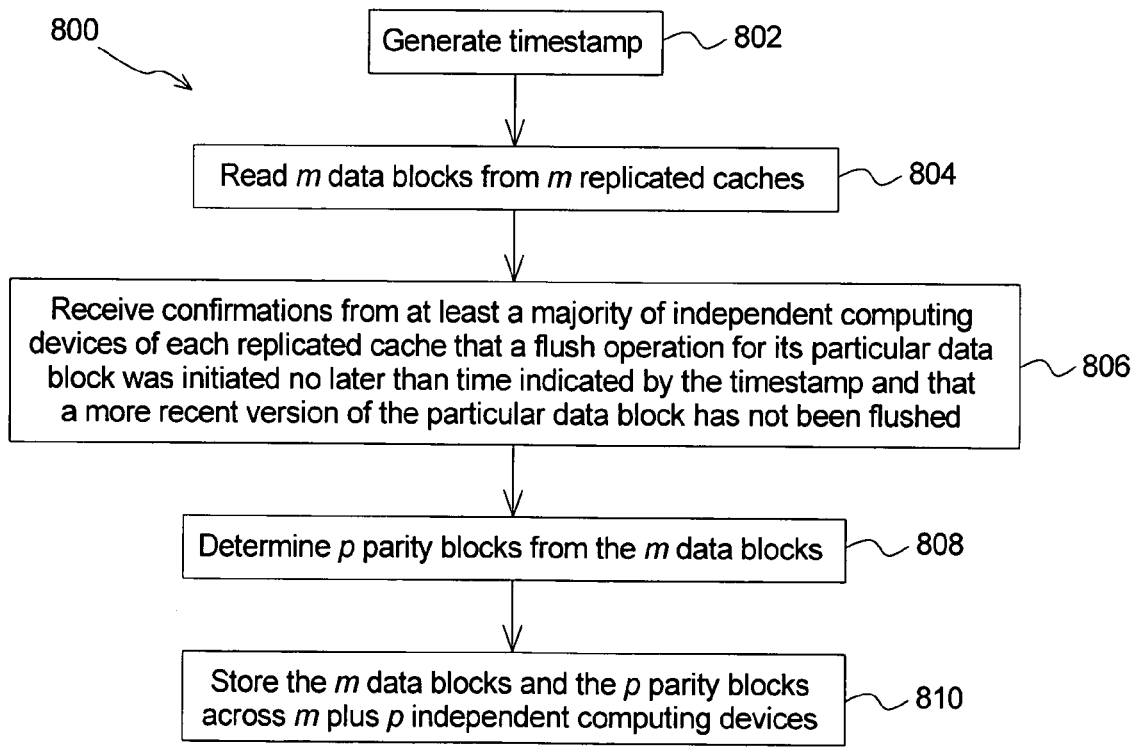
FIG. 8 illustrates an embodiment of another method of operating a distributed storage system of the present invention as a flow chart.

Another embodiment of a method of operating a distributed storage system of the present invention is illustrated as a flow chart in FIG. 8. The method 800 adds additional steps to the method 700 (FIG. 7), which include generating a timestamp and receiving confirmations from at least a majority of independent computing devices of each of a plurality of replicated caches, which ensure data consistency.

The method 800 begins with a first step 802 of generating a timestamp. Preferably, the timestamp is a unique timestamp so that other timestamps that may be issued will either precede or follow the timestamp. One technique for ensuring unique timestamps is to include a time indicator and an identifier for a computing entity that issued the timestamp.

In a second step 804, m data blocks are read from m replicated caches. Each replicated cache comprises p plus 1 of the independent computing devices. Each independent computing device of a replicated cache holds a particular data block in memory.

The method 800 continues with a third step 806 of receiving confirmations from at least a majority of the independent computing devices of each replicated cache that a flush operation for the particular data block was initiated no later than a time indicated by the timestamp and that a more recent version of the particular data block has not been flushed.

In a fourth step 808 p parity blocks are determined from the m data blocks. For example, the p parity blocks may be determined from the m data blocks using a Reed-Solomon erasure coding technique.

In a fifth step 810, the m data blocks and the p parity blocks are stored across m plus p independent storage devices. Each of the m plus p independent storage devices stores a single block selected from the m data blocks and the p parity blocks.

Figure 9:
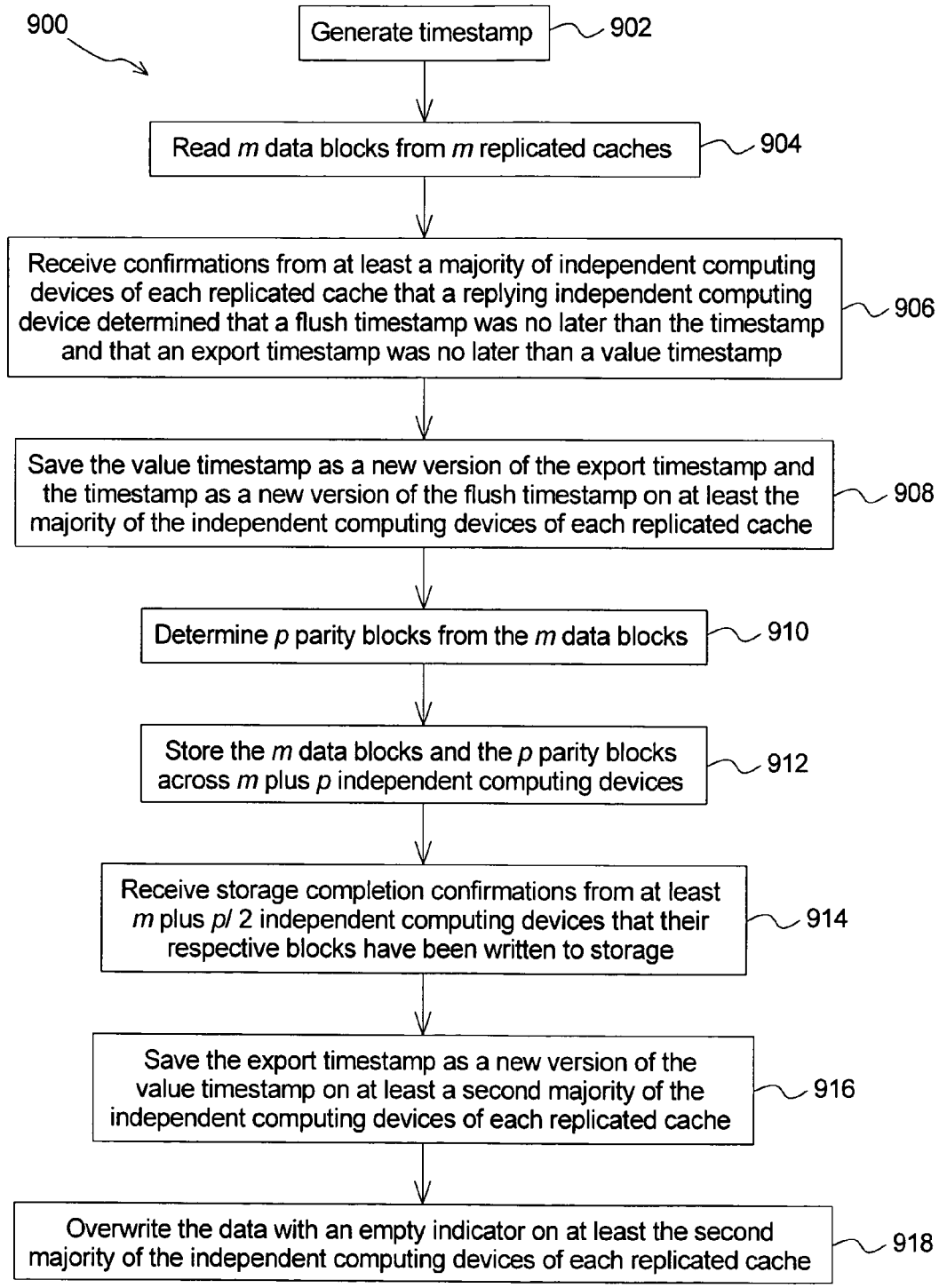
FIG. 9 illustrates an embodiment of another method of operating a distributed storage system of the present invention as a flow chart.

Another embodiment of a method of operating a distributed storage system of the present invention is illustrated as a flow chart in FIG. 9. The method 900 includes the method 800

(FIG. 8) and adds updating of flush and export timestamps in replicated caches as well as overwriting data in the replicated caches with empty indicators.

The method 900 begins with a first step 902 of generating a timestamp. In a second step 904, m data blocks and m value timestamps are read from m replicated caches. Each replicated cache comprises p plus 1 of the independent computing devices. Each independent computing device of a replicated cache holds a particular data block and an associated value timestamp in memory.

The method 900 continues with a third step 906 of receiving confirmations from at least a majority of the independent computing devices from each replicated cache that a replying independent computing device determined that a flush timestamp was no later than the timestamp and that an export timestamp was no later than the value timestamp. In a fourth step 908, the method 900 saves the value timestamp as a new version of the export timestamp and the timestamp as a new version of the flush timestamp on at least the majority of the independent computing devices for each replica set. Preferably, the third and fourth steps, 906 and 908, are performed atomically (i.e., without interruption).

In a fifth step 910 p parity blocks are determined from the m data blocks. For example, the p parity blocks may be determined from the m data blocks using a Reed-Solomon erasure coding technique. In a sixth step 912, the m data blocks and the p parity blocks are stored across m plus p independent computing devices. Each of the m plus p independent storage devices stores a single block selected from the m data blocks and the p parity blocks. In a seventh step 914, storage completion confirmations are received from at least m plus p/2 of the independent computing devices that their respective blocks (i.e., a data block or a parity block) have been written to storage.

In an eighth step 916, the export timestamp is saved as a new version of the value timestamp on at least a second majority of the independent computing devices for each replicated cache. In a ninth step 918, the data is overwritten with an empty indicator on at least the second majority of the independent computing devices for each replicated cache. The eighth and ninth steps, 916 and 918, may be delayed for a period of time so that the data may be read from the replicated cache rather than having to read it from the storage.

Figure 10:
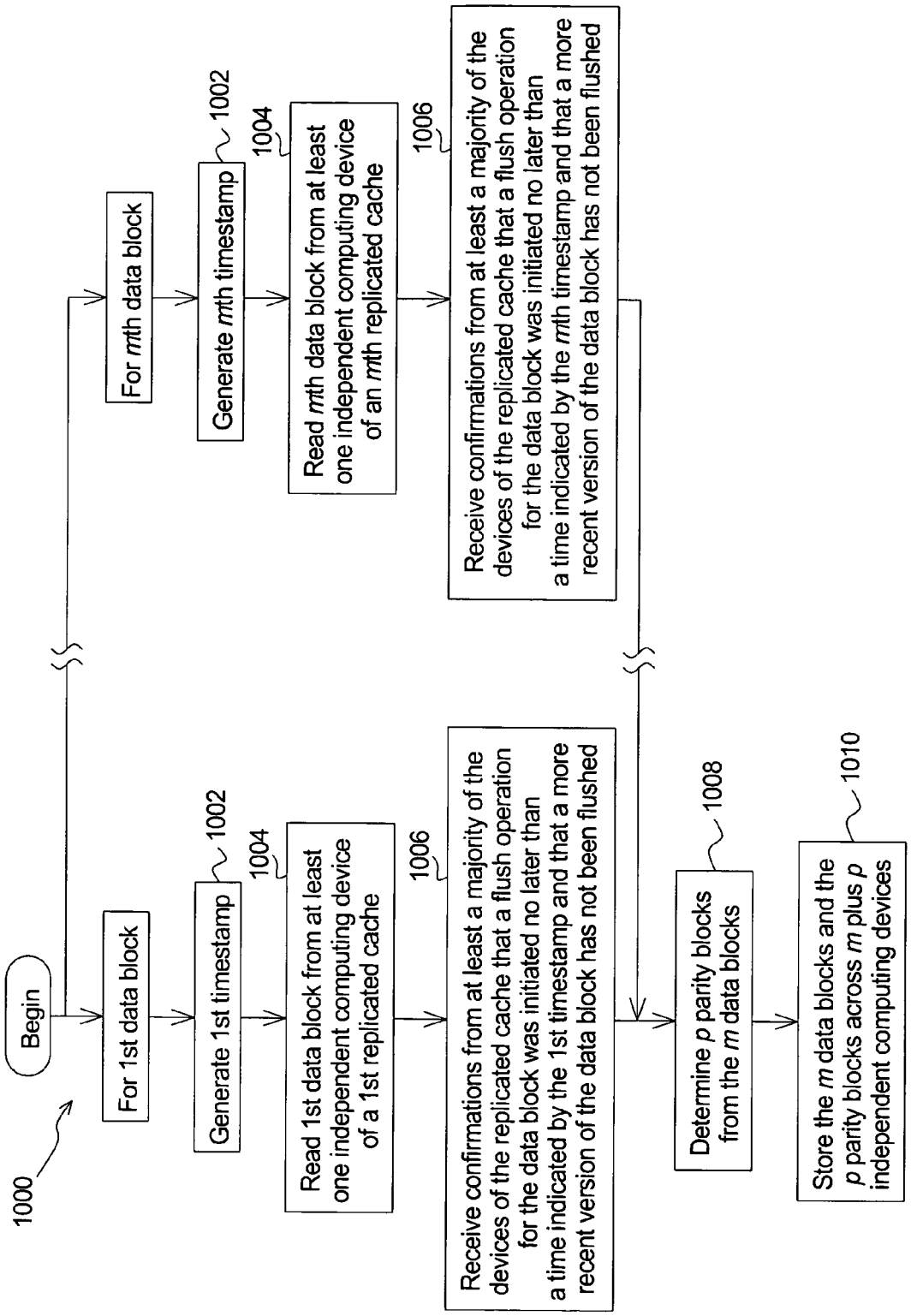
FIG. 10 illustrates an embodiment of another method of operating a distributed storage system of the present invention as a flow chart.

Another embodiment of a method of operating a distributed storage system of the present invention is illustrated as a flow chart in FIG. 10. The method 1000 is an alternative to the method 800 (FIG. 8) and employs a plurality of timestamps where the method 800 employs a timestamp. First through the third steps, 1002 . . . 1006, of the method 1000 are performed for each data block of m data blocks. In the first step 1002, a timestamp is generated. In the second step 1004, the data block is read from at least one independent computing device selected from a replicated cache that comprises p plus one independent computing devices. Each independent computing device of the p plus one independent computing devices is designated to hold the data block in memory. In the third step 1006, confirmations are received from at least a majority of the independent computing devices of the replicated cache that a flush operation for the data block was initiated no later than a time indicated by the timestamp and that a more recent version of the data block has not been flushed.

The method 1000 continues with a fourth step 1008 of determining p parity blocks from the m data blocks. In a fifth step 1010, the m data blocks and the p parity blocks are stored across m plus p independent storage devices. Each of the m plus p independent storage devices stores a single block selected from the m data blocks and the p parity blocks.

Figure 11A:
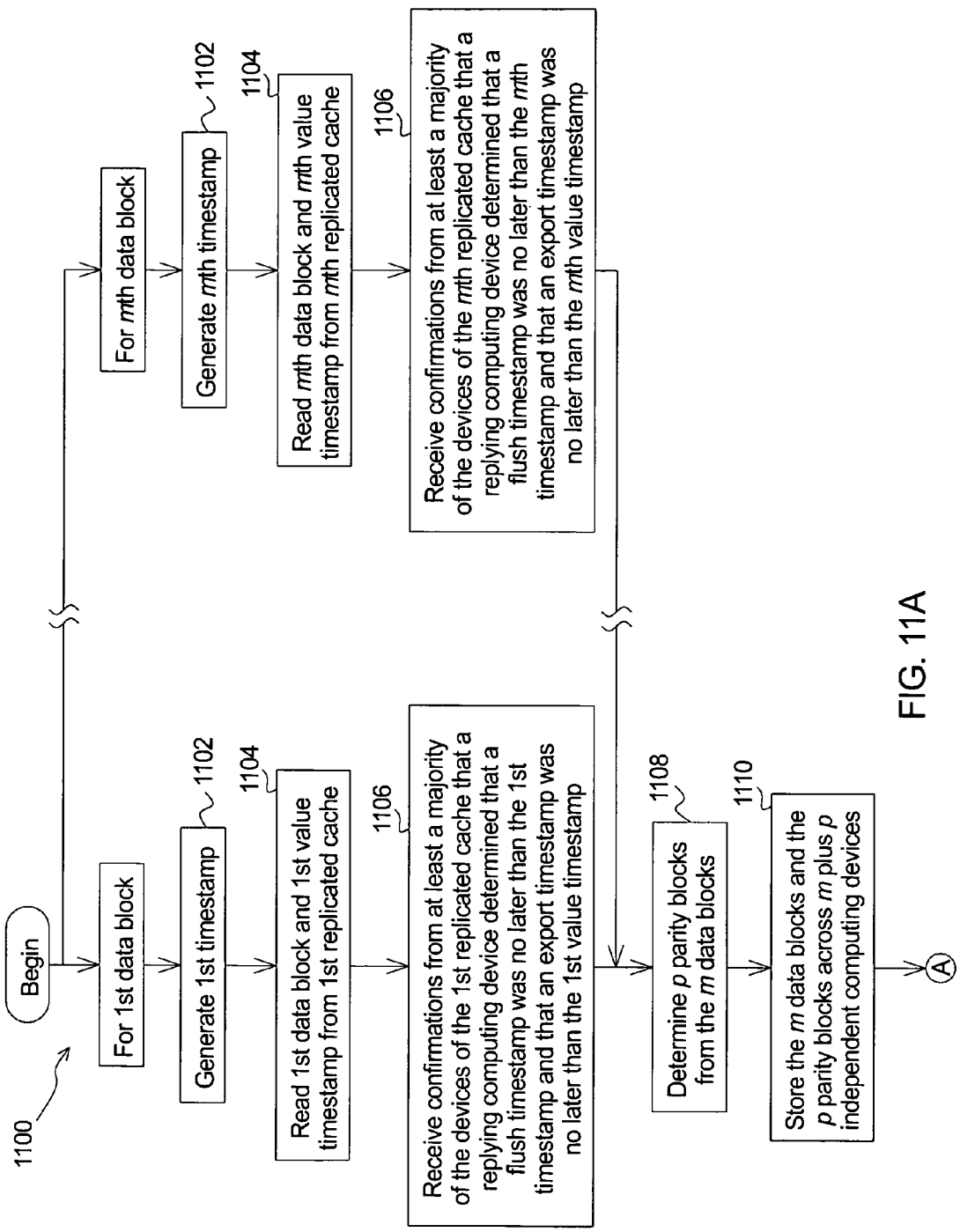
FIGS. 11A and 11B illustrate an embodiment of yet another method of operating a distributed storage system of the present invention as a flow chart.
Figure 11B:
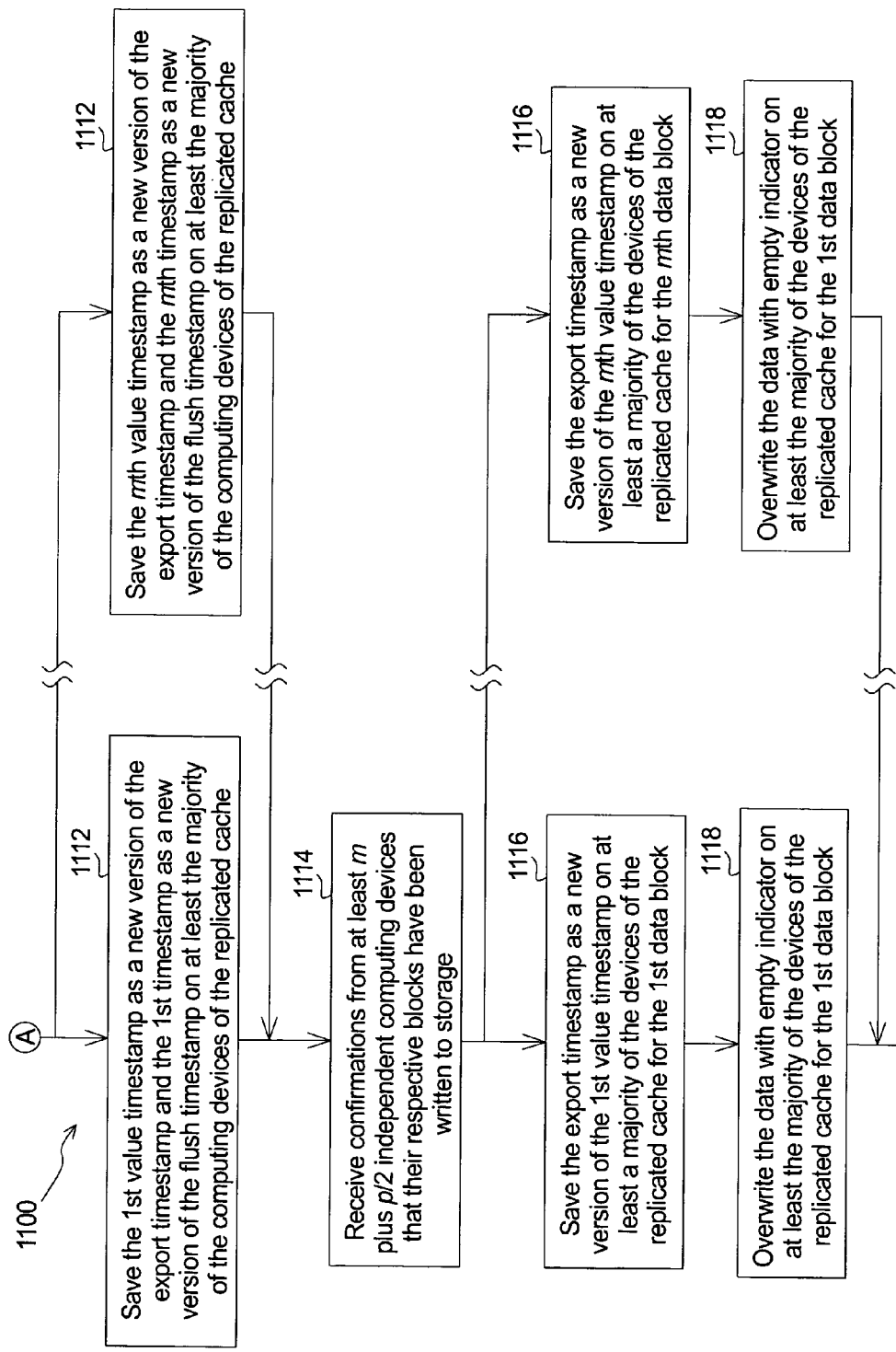

Another embodiment of a method of operating a distributed storage system of the present invention is illustrated as a flow chart in FIGS. 11A and 11B. The method 1100 is an alternative to the method 900 (FIG. 9) and employs a plurality of timestamps where the method 900 employs a timestamp. First through third steps, 1102 . . . 1106, of the method 1100 are performed for each data block of m data blocks. In a first step 1102, a timestamp is generated. In the second step 1104, the data block and a value timestamp is read from at least one independent computing device selected from a replicated cache that comprises p plus one independent computing devices. Each independent computing device of the p plus one independent computing devices is designated to hold the data block in memory. In the third step 1106, confirmations are received from at least a majority of the p plus one independent computing devices of the replicated cache that a replying independent computing device determined that a flush timestamp was no later than the timestamp and that an export timestamp was no later than the value timestamp.

The method continues with a fourth step 1108 of determining p parity blocks from the m data blocks. In a fifth step 1110, the m data blocks and the p parity blocks are stored across m plus p independent storage devices, each of the m plus p independent storage devices storing a single block selected from the m data blocks and the p parity blocks.

In a sixth step 1112, for each of the m data blocks, the value timestamp is saved as a new version of the export timestamp and the timestamp as a new version of the flush timestamp on at least the majority of the independent computing devices of the replicated cache. In a seventh step 1114, confirmations are received from at least m plus p/2 independent computing devices that their respective blocks have been written to storage.

Eighth and ninth steps, 116 and 118, are performed for each of the m data blocks. In the eighth step 1116, the export timestamp is saved as a new version of the value timestamp on at least a second majority of the independent computing devices of the replicated cache for the data block. In a ninth step 1118, the data is overwritten with an empty indicator on at least the second majority of the independent computing devices of the replicated cache for the data block. The eighth and ninth steps, 1116 and 1118, may be delayed for a period of time so that the data may be read from the replicated cache rather than having to read it from the storage.

3. Pseudo Code Embodiments of Methods of the Present Invention

Embodiments of a method of operating a replicated cache of the present invention are provided as pseudo code in FIGS. 12A and 12B. FIG. 12A provides a coordinator algorithm 1200 for the embodiments; FIG. 12B provides a cache device algorithm 1250 for the embodiments. The cache device algorithm 1250 provides procedures for the independent computing devices of the replicated cache that are invoked by calls from the coordinator.

It will be readily apparent to one skilled in the art that the coordinator algorithm 1200 (FIG. 12A) and the cache device algorithm 1250 (FIG. 12B) provide embodiments of a method of operating a replicated cache for data val that implicitly include an identification of the data val. For example, the data val may be identified using a logical volume identifier, an offset, and a length.

An embodiment of a method of operating a replicated cache of the present invention comprises a get-state(ts) procedure 1202 (FIG. 12A), a Read procedure 1252 (FIG. 12B), and an ExtUpdate procedure 1254 (FIG. 12B). The get-state(ts) procedure 1202 is executed by the coordinator and includes Read and ExtUpdate calls to the independent computing devices of the replicated cache. In response to the Read and ExtUpdate calls from the coordinator, the independent computing devices of the replicated cache execute the Read procedure 1252 and the ExtUpdate procedure 1254, respectively.

The embodiment of the method of operating the replicated cache begins with issuing a new timestamp, which is preferably a unique timestamp. For example, the coordinator may execute a newTS( ) command and provide the resulting timestamp as the timestamp ts in the get-state(ts) call. In line 2, the coordinator issues Q-form([Read, $D_i$]) messages to the independent computing devices of the replicated cache. $D_i$ stands for the set of independent computing devices of the replicated cache and indicates that all of the independent computing devices of the replicated cache are to return the data val if possible.

The Q-form([Read, $D_i$]) messages invoke the Read procedure 1252 at the independent computing devices of the replicated cache. In line 54, each independent computing device determines whether a value timestamp val-ts for the data val is no earlier than an order timestamp ord-ts for the data val and, if so, assigns true to the variable status. If the value timestamp val-ts is earlier than the order timestamp ord-ts, the independent computing device assigns false to the variable status. The latter situation indicates that a write to the independent computing device is in progress. In line 55, the independent computing device returns the variable status, the value timestamp val-ts, and the data val to the coordinator in a Q-reply([status, val-ts, val]) message.

The coordinator waits at line 2 of the get-state(ts) procedure 1202 until receiving replies from a majority of the independent computing devices of the replicated cache that have a true value for the variable status. The majority of the independent computing devices is a quorum condition that ensures correct operation of the replicated cache even when one or more of the independent computing devices of the replicated cache are unavailable. In lines 3 and 4, the coordinator determines the highest value timestamp max-ts returned and the corresponding most recent version of the data max-val from among the replies having the true value for the variable status. The coordinator then issues Q-form([ExtUpdate, ts, max-ts]) messages to the independent computing devices of the replicated cache in line 5.

The Q-form([ExtUpdate, ts, max-ts]) messages invoke the ExtUpdate procedure 1254 at the independent computing devices of the replicated cache. In line 58, each independent computing device determines whether the timestamp ts is no earlier than a flush timestamp flush-ts and whether a current timestamp cur-ts (the highest value timestamp max-ts provided by the coordinator) is no earlier than an export timestamp export-ts. If so, the independent computing device assigns true to the variable status; if not, the independent computing device assigns false to the variable status. If the variable status has a true value, the independent computing device saves the current timestamp cur-ts as the export timestamp export-ts in line 60 and it saves the timestamp ts as the flush timestamp flush-ts in line 61. In line 62, the independent computing device returns the variable status to the coordinator in a Q-reply([status]) message.

The coordinator waits at line 5 until receiving at least a majority of replies from the independent computing devices of the replicated cache that include a true value for the variable status. If no reply is false, the coordinator provides the most recent version of the data max-val to the caller in line 6. If a reply is false, the coordinator calls a recover procedure in line 7. If the recover procedure is unsuccessful, the coordinator aborts in line 8. If the recover procedure is successful, the coordinator issues Q-form([ExtUpdate, ts, ts]) messages to the independent computing devices of the replicated cache in line 9. The recover procedure is discussed in more detail below.

The Q-form([ExtUpdate, ts, ts]) messages invoke the ExtUpdate procedure 1254 at the independent computing devices of the replicated cache with the current timestamp cur-ts having the value of the timestamp ts. The coordinator waits at line 9 until receiving at least a majority of replies from the independent computing devices of the replicated cache that include a true value for the variable status. In line 10, the coordinator provides the data val to the caller if no reply has a false value for the variable status. If a reply does have a false value for the variable status, the coordinator aborts in line 12.

The embodiment of the method of operating the replicated cache of the present invention may further include a compress (ts) procedure 1204 (FIG. 12A) and a Compress procedure 1256 (FIG. 12B). The compress(ts) procedure 1204 is executed by a coordinator and includes a Compress call to the independent computing devices of the replicated cache. In response to the Compress call, the independent computing devices of the replicated cache execute the Compress procedure 1256. The compress(ts) procedure 1204 and the Compress procedure 1256 replace the data val with EMPTY so that a read of the replicated cache returns EMPTY to the read caller signifying that the data val is to be obtained from the storage.

The compress(ts) procedure 1204 begins with the coordinator issuing Q-form([Compress, ts]) messages to the independent computing devices of the replicated cache in line 13. The Q-form([Compress, ts]) messages invoke the Compress procedure 1256 at the independent computing devices of the replicated cache. In line 64, each independent computing device of the replicated cache determines whether the timestamp ts is no earlier than the flush timestamp flush-ts and whether the export timestamp export-ts is no earlier than the value timestamp val-ts. If so, the independent computing device assigns true to the variable status. If not, the independent computing device assigns false to the variable status. In lines 65-67, if the variable status has a true value, the independent computing device stores EMPTY as the data val and stores the export timestamp export-ts as the value timestamp val-ts. In line 68, the independent computing device returns the variable status to the coordinator in a Q-reply([status]) message.

The coordinator waits at line 13 of the compress(ts) procedure 1204 until receiving replies from a majority of the independent computing devices of the replicated cache that have a true value for the variable status. If a reply is false, the coordinator aborts in line 14. Otherwise, the coordinator recognizes successful completion of the compress(ts) procedure 1204 in line 15.

The embodiment of the method of operating the replicated cache of the present invention may further include receiving a newer version of the data val, bypassing the replicated cache, and storing the newer version of the data val in storage. Such an embodiment may include a coordinator performing advance(ts) and invalidate(ts) procedures, 1206 and 1208 (FIG. 12A), which call the ExtUpdate and Compress procedures, 1254 and 1256 (FIG. 12B), respectively, at the independent computing devices of the replicated cache. The advance(ts) procedure 1206 adjusts the export timestamp export-ts and the flush timestamp flush-ts to signify that the newer version of the data val has been written to storage. The invalidate(ts) procedure 1208 overwrites the data val in the replicated cache with EMPTY.

The embodiment of the method of operating the replicated cache of the present invention may further include writing a newer version of the data val to the independent computing devices of the replicated cache. Such an embodiment may include a coordinator performing a write(val) procedure 1210 (FIG. 12A), which calls Order and Write procedures, 1258 and 1260, at the independent computing devices of the replicated cache.

The write(val) procedure 1210 begins with the coordinator issuing a timestamp ts in line 27. In line 28, the coordinator issues Q-form([Order, ts]) messages to the independent computing devices of the replicated cache. In response to receiving the Q-form([Order, ts]) messages, the independent computing devices of the replicated cache invoke the Order procedure 1258. In line 70, each independent computing device of the replicated cache determines whether the timestamp ts is later than most recent value and order timestamps, val-ts and ord-ts. If so, the independent computing device assigns true to the variable status. If not, the independent computing device assigns false to the variable status. In line 71, the independent computing device saves the timestamp ts as the order timestamp ord-ts if the variable status has the true value. In line 72, the independent computing device returns the variable status to the coordinator in a Q-reply([status]) message.

The coordinator waits at line 28 of the write(val) procedure 1210 until receiving replies from a majority of the independent computing devices of the replicated cache that have a true value for the variable status. In line 29, the coordinator aborts if a reply has a false value for the variable status. In line 30, the coordinator issues Q-form([Write, val, ts]) messages to the independent computing devices of the replicated cache. In response to receiving the Q-form([Write, val, ts]) messages, the independent computing devices of the replicated cache invoke the Write procedure 1260. In line 74, each independent computing device determines whether the timestamp ts is later than the value timestamp val-ts and whether the timestamp ts is no earlier than the order timestamp ord-ts. If so, the independent computing device assigns true to the variable status. If not, the independent computing device assigns false to the variable status. In lines 75-77, if the variable status has the true value, the independent computing device stores the data val and stores the timestamp ts as the value timestamp val-ts. In line 78, the independent computing device provides the variable status to the coordinator in a Q-reply([status]) message.

The coordinator waits at line 30 of the write(val) procedure 1210 until receiving replies from a majority of the independent computing devices of the replicated cache that have a true value for the variable status. In line 31, if all replies have the true value for the variable status, the coordinator recognizes a completed write of the newer version of the data val. If a reply is false, the coordinator aborts in line 32.

The embodiment of the method of operating the replicated cache of the present invention may further include reading the data val in response to a request for the data from a client. Such an embodiment may include a read( ) procedure 1212 (FIG. 12A) and the Read procedure 1252 (FIG. 12B).

The read( ) procedure 1212 begins with a coordinator selecting an arbitrarily chosen independent computing device from the independent computing devices of the replicated cache in line 34. In line 35, the coordinator issues Q-form ([Read, {j}]) messages to the independent computing devices of the replicated cache, where j indicates the randomly chosen independent computing device. In response to receiving the Q-form([Read, {j}]) messages, the independent computing devices invoke the Read procedure 1252. In line 54, each independent computing device determines whether the value timestamp val-ts is no earlier than the order timestamp ord-ts. If so, the independent computing device assigns true to the variable status. If not, the independent computing device assigns false to the variable status. If the independent computing device is the randomly chosen device, it returns the variable status, the value timestamp val-ts, and the data val to the coordinator in line 55. If not, the independent computing device returns the variable status and the value timestamp val-ts to the coordinator in line 56.

The coordinator waits at line 35 of the read( ) procedure 1212 until receiving replies from a majority of the independent computing devices of the replicated cache that have a true value for the variable status. In line 36, if all replies are true, the randomly chosen independent computing device responded, and all value timestamps val-ts's are equal, the data val is provided to the client. Otherwise, the coordinator calls a recover(newTS( )) procedure in line 37.

The embodiment of the method of operating the replicated cache may include performing a recovery operation. Such an embodiment may include a recover(ts) procedure 1214 (FIG. 12A), an Order&Read procedure 1262 (FIG. 12B), and the Write procedure 1260 (FIG. 12B).

The recover(ts) procedure 1214 begins with a coordinator issuing Q-form([Order&Read, ts]) messages to the independent computing devices of the replicated cache in line 39. In response to receiving the Q-form([Order&Read, ts]) messages, the independent computing devices of the replicated cache invoke the Order&Read procedure 1262. In line 80, each independent computing device of the replicated cache determines whether the timestamp ts is later than most recent value and order timestamps, val-ts and ord-ts. If so, the independent computing device assigns true to the variable status. If not, the independent computing device assigns false to the variable status. In line 81, if the variable status has the true value, the independent computing device saves the timestamp ts as the order timestamp ord-ts. In line 82, the independent computing device returns the the value timestamp val-ts, the data val, and the variable status to the coordinator in a Q-reply ([val-ts, val, status]) message.

The coordinator waits at line 39 of the recover(ts) procedure 1214 until receiving replies from a majority of the independent computing devices of the replicated cache that have a true value for the variable status. In line 40, if a reply is false, the coordinator aborts. In line 41, the coordinator identifies the data val as the data val having the most recent value timestamp val-ts.

In line 42, the coordinator issues Q-form([Write, val, ts]) messages to the independent computing devices of the replicated cache. In response to receiving the Q-form([Write, val, ts]) messages, the independent computing devices of the replicated cache invoke the Write procedure 1260. In line 74, each independent computing device determines whether the timestamp ts is later than the value timestamp val-ts and whether the timestamp ts is no earlier than the order timestamp ord-ts. If so, the independent computing device assigns true to the variable status. If not, the independent computing device assigns false to the variable status. In lines 75-77, if the variable status has the true value, the independent computing device stores the data val and stores the timestamp ts as the value timestamp val-ts. In line 78, the independent computing device provides the variable status to the coordinator in a Q-reply([status]) message.

The coordinator waits at line 42 of the recover(ts) procedure 1214 until receiving replies from a majority of the independent computing devices of the replicated cache that have a true value for the variable status. If all replies are true, the coordinator returns the data val to the caller of recover(ts) procedure 1214 in line 43. If not, the coordinator returns abort in line 44.

Embodiments of a method of operating a distributed storage system of the present invention are provided as pseudo code in FIG. 13. The embodiments of the method are provided as a plurality of procedures that collectively form a coordinator algorithm 1300. In the coordinator algorithm 1300, some calls are proceeded with a cache[index] or cache [i] indicator that identifies that the call is to an ith replicated cache; some other calls are proceeded by a strip indicator that identifies that the call is to n independent computing devices that store a stripe of m data blocks as erasure coded data. As used herein, a stripe of data is the m data blocks and a strip of data is the m data blocks and p parity blocks, where n=m+p.

Like the replicated cache, the independent computing devices that store a strip of data employ a quorum condition, which ensures correct operation even when one or more of the independent computing devices are unavailable. For a strip of erasure coded data stored across n independent computing devices, the quorum conditions is that at least m plus p/2 of the independent computing devices must respond correctly. In the algorithm 1300, a coordinator may abort an operation when the quorum condition is not met. Such aborts are considered exceptions and are not caught by the algorithm 1300. Rather, the algorithm propagates the aborts to a higher level, which may decide to repeat a procedure, attempt a recovery, abort, or take some other action.

An embodiment of the method of operating the distributed storage system comprises a coordinator executing a synthesize-stripe( ) procedure 1302. The synthesize-stripe( ) procedure 1302 moves a stripe of data, or a subset of data blocks of the stripe, from replicated caches to erasure coded storage residing across n independent computing devices. The replicated caches may be formed from memory within the n independent computing devices or a subset of the n independent computing devices. Alternatively, the replicated caches may be formed from memory on other independent computing devices or a mixture of independent computing devices selected from the n independent computing devices and other independent computing devices. Each of m data blocks of a stripe is stored in a replicated cache, which is formed from memory on p plus one independent computing devices. There are m replicated caches for a stripe of data.

If the m replicated caches hold a more recent stripe of data than a version held in storage (or the storage holds no version of the stripe of data), the synthesize-stripe( ) 1302 procedure flushes the stripe from the replicated caches to storage as a full stripe write. If more than half of the m replicated caches hold more recent versions of data blocks than data blocks available in the storage, the synthesize-stripe( ) procedure 1302 flushes the data blocks having more recent versions from the replicated caches, reads missing data blocks of the stripe from the storage, and writes the stripe as a full stripe write. If no more than half of the m replicated caches designated to hold the stripe have more recent versions of data blocks, the synthesize-stripe( ) procedure 1302 writes each new data block to storage using a single data block write.

While the synthesize-stripe( ) procedure 1302 can write data from the replicated caches to the storage regardless of whether an entire stripe is present in the replicated caches, it is substantially more efficient to write full stripes, or almost full stripes (which are made full by reading missing data into cache from storage). For example, in an erasure coded storage system with m=8 data blocks and p=2 parity blocks, a full stripe write with all 8 data blocks from the stripe present in the cache requires 10 individual writes to storage; by contrast, if those same 8 data blocks were written out individually, because they are not present in the cache at the same time to form a full stripe, this may require 24 reads from the storage and 24 writes to the storage. For this reason, it is preferable to wait until the full stripe has been cached before writing it to storage, or it can be determined that a full stripe will not be cached in the near future. To make this possible, it is also important that the cache be reliable, since the data may reside in the caches for a long time before it is written to storage; hence the need for caches that are replicated (i.e., a form of redundancy) or are otherwise made highly reliable (i.e., using another form of redundancy).

In line 105 of the synthesize-stripe( ) procedure 1302, a coordinator issues a new timestamp for each of the m data blocks to form times[i], where i corresponds to data blocks 1 through m. In line 106, the coordinator calls a get-state(times [i]) procedure (e.g., the get-state(ts) procedure 1202 of FIG. 12A) for each of the m data blocks that form the stripe. In lines 107-112, if fewer than half of the replicated caches for the stripe have empty values, the coordinator reads any missing data blocks from storage and writes the stripe as a full-stripe write to storage. In lines 113-116, if at least half of the replicated caches have empty values, the coordinator writes data blocks that do not have empty values using the single data block write. In line 117, the coordinator calls a compress (times[i]) procedure for each of the m data blocks to write an empty value to the replicated cache for the data block.

The embodiment of the method of operating the distributed storage system may further include the coordinator executing a write-stripe(stripe) procedure 1304 that bypasses the replicated caches. For example, the write-stripe(stripe) procedure 1304 may be employed when a client provides a full stripe of data to the coordinator allowing the coordinator to directly write the full stripe of data to storage on the n independent computing devices as m data blocks and p parity blocks. In line 120, the coordinator issues a new timestamp ts. In line 121, the coordinator calls an advance(ts) procedure (e.g., the advance(ts) procedure 1206 of FIG. 12A) for each of the m data blocks, which establishes a new order timestamp ord-ts, a new export timestamp export-ts, and a new flush timestamp flush-ts for the data block on its replicated cache. In line 122, the coordinator writes the full stripe to the n independent computing devices. In line 123, the coordinator calls an invalidate procedure (e.g., the invalidate(ts) procedure 1208 of FIG. 12A) for each of the m data blocks, which writes an empty value and a new value timestamp val-ts to each of the m replicated caches.

The embodiment of the method of operating the distributed storage system may further include the coordinator executing a write-block(val, index) procedure 1306. For example, the write-block(val, index) may be employed when the coordinator receives a data block selected from the m data blocks of the stripe from a client. In line 126, the coordinator calls a write(val) procedure (e.g., the write(val) procedure 1210 of FIG. 12A) to write the data val to the replicated cache indicated by the index.

The embodiment of the method of operating the distributed storage system may further include the coordinator executing a read-stripe( ) procedure 1308. For example, the read-stripe( ) procedure 1308 may be employed when the coordinator receives a read request from a client. In line 128, the coordinator executes a read-block(i) procedure 1310 for each of the m data blocks of the stripe. In line 131 of the read-block (index) procedure 1310, the coordinator executes a read( ) call (e.g., the read( ) procedure 1212 of FIG. 12A) to each of the m replicated caches designated to hold the m data blocks. If one or more of the replicated caches return an empty value, the coordinator reads the appropriate data blocks from storage in line 132.

Further description of embodiments of the full stripe write to the n independent computing devices and the single data block write as well as other erasure coded storage procedures for operation of the n independent computing devices is provided in: U.S. patent application Ser. No. 10/693,573, entitled "Methods of Reading and Writing Data," filed on Oct. 23, 2003, which is hereby incorporated by reference in its entirety; U.S. patent application Ser. No. 10/693,743, entitled "Method of Recovering Data," filed on Oct. 23, 2003, which is hereby incorporated by reference in its entirety; and U.S. patent application Ser. No. 10/693,758, entitled "Methods of Reading and Writing Data," filed on Oct. 23, 2003, which is hereby incorporated by reference in its entirety. The full stripe write to the n independent computing devices provided in these applications is modified slightly for use in the present invention. Here, the timestamp is provided as a parameter in the call of the full stripe write.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of operating a distributed storage system comprising the steps of:
   reading m data blocks from a distributed cache, the distributed cache comprising m replicated caches, each replicated cache comprising a plurality of independent computing devices, each independent computing device of the replicated caches holding a replica of a particular one of the m data blocks in memory; and
   storing erasure-coded data, including the m data blocks and p parity blocks across m plus p independent computing devices, the p parity blocks being computed from the m data blocks obtained during said step of reading and each of the m plus p independent computing devices storing a single block selected from the m data blocks and the p parity blocks,
   wherein each replicated cache comprises p plus one of the independent computing devices.

2. The method of claim 1 further comprising generating a timestamp.

3. The method of claim 2 further comprising receiving confirmations from at least a majority of the independent computing devices from each replicated cache that a flush operation for the particular data block was initiated no later than a time indicated by the timestamp and that a more recent version of the particular data block has not been flushed.

4. The method of claim 1 further comprising generating in times tamps.

5. The method of claim 4 further comprising associating each of the in timestamps to a particular read operation for the particular data block.

6. The method of claim 5 further comprising receiving confirmations from at least a majority of the independent computing devices from each replicated cache that a flush operation for the particular data block was initiated no later than a time indicated by a particular timestamp and that a more recent version of the particular data block has not been flushed.

7. The method of claim 1 wherein the m data blocks form a first stripe of data and the replicated caches are first replicated caches and further comprising reading a second stripe of data from second replicated caches.

8. The method of claim 7 wherein the first and second replicated caches intersect in at least one independent computing device.

9. The method of claim 1 further comprising receiving a new version of the m data blocks.

10. The method of claim 9 further comprising determining a new version of the p parity blocks from the new version of the m data blocks.

11. The method of claim 10 further comprising storing the new version of the m data blocks and the new version of the p parity blocks across the m plus p independent computing devices.

12. A method of operating a distributed storage system comprising the steps of:
   generating a timestamp;
   reading m data blocks from m replicated caches, each replicated cache comprising p plus one independent computing devices, each independent computing device of a replicated cache holding a particular data block in memory;
   receiving confirmations from at least a majority of the independent computing devices of each replicated cache that a flush operation for the particular data block was initiated no later than a time indicated by the timestamp and that a more recent version of the particular data block has not been flushed;
   determining p parity blocks from the m data blocks; and
   storing the m data blocks and the p parity blocks across m plus p independent computing devices, each of the m plus p independent computing devices storing a single block selected from the m data blocks and the p parity blocks.

13. The method of claim 12 wherein the reading of each of the m data blocks further comprises reading a value timestamp, thereby reading in value timestamps.

14. The method of claim 13 wherein each confirmation indicates that a replying independent computing device determined that a flush timestamp was no later than the timestamp and that an export timestamp was no later than the value timestamp.

15. The method of claim 14 further comprising saving the value timestamp as a new version of the flush timestamp and the timestamp as a new version of the export timestamp on at least the majority of the independent computing devices of each replicated cache.

16. The method of claim 15 further comprising receiving storage-device confirmations from the m plus p independent computing devices that the m data blocks have been written to storage.

17. The method of claim 16 further comprising saving the export timestamp as a new version of the value timestamp on at least a second majority of the independent computing devices of each replicated cache.

18. The method of claim 17 further comprising overwriting the data with an empty indicator on at least the second majority of the independent computing devices of each replicated cache.

19. A computer readable medium comprising computer code for implementing a method of operating a distributed storage system, the method of operating the distributed storage system comprising the steps of:
   reading m data blocks from a distributed cache, the distributed cache comprising m replicated caches, each replicated cache comprising plurality of independent computing devices, each independent computing device of the replicated caches holding a replica of a particular one of the m data blocks in memory; and storing erasure-coded data, including the m data blocks and p parity blocks across m plus p independent computing devices, the p parity blocks being computed from the m data blocks obtained during said step of reading and each of the m plus p independent computing devices storing a single block selected from the m data blocks and the p parity blocks, wherein each replicated cache comprises p plus one of the independent computing devices.

* * * * *

UNITED STATES PATENT AND TRADEMARK OFFICE
CERTIFICATE OF CORRECTION

PATENT NO. : 7,725,655 B2
APPLICATION NO. : 11/357815
DATED : May 25, 2010
INVENTOR(S) : Svend Frolund et al.

It is certified that error appears in the above-identified patent and that said Letters Patent is hereby corrected as shown below:

In column 17, lines 52-53, in Claim 4, delete "in times tamps." and insert -- m timestamps. --, therefor.

In column 17, line 55, in Claim 5, delete "in" and insert -- m --, therefor.

In column 18, line 36, in Claim 13, delete "in" and insert -- m --, therefor.

In column 18, line 48, in Claim 16, delete "storage-device" and insert -- storage device --, therefor.

Signed and Sealed this

Twenty-eighth Day of September, 2010

David J. Kappos
*Director of the United States Patent and Trademark Office*